(12) United States Patent
El Amrani et al.

(10) Patent No.: US 12,717,198 B2
(45) Date of Patent: Aug. 25, 2026

(54) METHOD AND DEVICE FOR PRESSING AGAINST EACH OTHER TWO OPHTHALMIC LENSES IN ORDER TO BUILD AN ELECTROCHROMIC CELL

(71) Applicant: Essilor International, Charenton-le-Pont (FR)

(72) Inventors: Rachid El Amrani, Dijon (FR); Antoine Monvoisin, Beire le Fort (FR)

(73) Assignee: Essilor International, Charenton-le-Pont (FR)

( * ) Notice: Subject to any disclaimer, the term of this patent is extended or adjusted under 35 U.S.C. 154(b) by 270 days.

(21) Appl. No.: 18/570,770

(22) PCT Filed: Jun. 14, 2022

(86) PCT No.: PCT/EP2022/066104

§ 371 (c)(1),
(2) Date: Dec. 15, 2023

(87) PCT Pub. No.: WO2022/263408

PCT Pub. Date: Dec. 22, 2022

(65) Prior Publication Data

US 2024/0280873 A1 Aug. 22, 2024

(30) Foreign Application Priority Data

Jun. 17, 2021 (EP) .................................... 21305829

(51) Int. Cl.
*G02F 1/153* (2006.01)
*G02C 7/10* (2006.01)

(52) U.S. Cl.
CPC ............. *G02F 1/153* (2013.01); *G02C 7/101* (2013.01)

(58) Field of Classification Search
CPC ................................ G02F 1/153; G02C 7/101
USPC ......................................................... 359/265
See application file for complete search history.

(56) References Cited

U.S. PATENT DOCUMENTS

2008/0314499 A1 12/2008 Begon et al.
2018/0196283 A1 7/2018 Ballet et al.

FOREIGN PATENT DOCUMENTS

AU 5644800 A 3/2001
CN 209103031 U 7/2019
EP 3 320 394 B1 9/2020

(Continued)

OTHER PUBLICATIONS

International Search Report & Written Opinion issued Sep. 13, 2022 in PCT/EP2022/066104, filed on Jun. 14, 2022, 12 pages.

(Continued)

*Primary Examiner* — William Choi
(74) *Attorney, Agent, or Firm* — Oblon, McClelland, Maier & Neustadt, L.L.P.

(57) ABSTRACT

A device for pressing against each other a first ophthalmic lens having a first face and a second ophthalmic lens having a second face in order to build an electrochromic cell comprising a cavity delimited by the first and second faces, the first and second ophthalmic lenses being superposed and an adhesive substance being applied on at least one of the first and second faces to form the cavity, comprises the first and second ophthalmic lenses and at least one spring adapted to apply a pressure effort on the first and second ophthalmic lenses. It further comprises a programmable electric motor adapted to actuate said at least one spring and to control said pressure effort.

16 Claims, 2 Drawing Sheets

(56) References Cited

FOREIGN PATENT DOCUMENTS

FR 2 883 984 A1 10/2006

OTHER PUBLICATIONS

Office Action dated Mar. 13, 2026, issued in counterpart CN Application No. 202280040457.8, citing documents No. 1 and 2, with English Translation. (15 pages).

METHOD AND DEVICE FOR PRESSING AGAINST EACH OTHER TWO OPHTHALMIC LENSES IN ORDER TO BUILD AN ELECTROCHROMIC CELL

CROSS-REFERENCE TO RELATED APPLICATION

The present application is a national stage application of PCT Application No: PCT/EP2022/066104, filed Jun. 14, 2022, which claims priority to European Patent application Ser. No. 21/305,829.0, filed on Jun. 17, 2021. The benefit of priority is claimed to each of the foregoing, and the entire contents of each of the foregoing are incorporated herein by reference.

FIELD OF THE DISCLOSURE

The present disclosure relates to a method and device for pressing against each other two ophthalmic lenses in order to build an electrochromic cell.

BACKGROUND OF THE DISCLOSURE

An electrochromic cell has typically a structure comprising two curved transparent outer layers that are two ophthalmic lenses, the inner surfaces of which are covered by a transparent electrically conductive coating.

Document EP 3 320 394 B1 discloses an ophthalmic device with an electrochromic cell.

The cavity located between the two electrically conductive coatings is filled with an electrochromic composition.

Thus, the light transmission factor of the cell can be varied, by applying an electrical field between the electrically conductive coatings.

The maintaining of the two outer layers and the closing of the cavity are performed by means of a peripheral sealing joint.

A constant gap of about 150 μm must be present all over the lens surface. Generally, this gap is obtained by means of microspheres that are contained in the adhesive substance of the sealing joint.

However, the microspheres are not strong enough to absorb a high amount of energy. In other words, if the pressure applied to the microspheres is too high, they may collapse. On the other hand, if the pressure effort is not strong enough, the gap will not be respected.

Therefore, there is an unfulfilled need for a method that makes it possible to apply a suitable pressure effort to the lenses forming the cavity of the electrochromic cell.

SUMMARY OF THE DISCLOSURE

An object of the disclosure is to overcome at least some of the above-mentioned limitations of the prior art and fulfill the above-mentioned need.

To that end, the disclosure provides a method according to claim 1 for pressing against each other a first ophthalmic lens having a first face and a second ophthalmic lens having a second face in order to build an electrochromic cell comprising a cavity delimited by the first and second faces.

Thus, thanks to the spring, it is possible to control the pressure effort to be applied to the lenses so that the value of the required gap between the lenses is complied with.

According to particular possible features, which may be combined or taken alone, of the method succinctly described above:

- the managing may comprise defining the pressure effort by a predetermined maximum value of the pressure;
- the method may comprise applying the pressure effort in a periphery of the first and second ophthalmic lenses;
- the managing may comprise defining the pressure effort by a predetermined maximum value of an operating current of the motor beyond which the motor is programmed to stop;
- the method may further comprise measuring the pressure effort by using a pressure gauge located between the motor and the first and second ophthalmic lenses, the motor being programmed to stop when the pressure reaches the maximum value;
- the method may comprise applying the pressure effort centrally on the first and second ophthalmic lenses.

To the same end, the present disclosure also provides a device according to claim 7 for pressing against each other a first ophthalmic lens having a first face and a second ophthalmic lens having a second face in order to build an electrochromic cell comprising a cavity delimited by the first and second faces.

According to particular possible features, which may be combined or taken alone, of the device succinctly described above:

- the device may further comprise three, five or six pressers each including one of the at least one spring;
- the device may further comprise a pressure gauge located between the motor and the first and second ophthalmic lenses;
- the device may further comprise a motor encoder adapted to program the programmable electric motor.

As the device succinctly described above has the same advantages as the method, those advantages are not repeated here.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE DISCLOSURE

Figure 1:
FIG. 1 is a schematic perspective view of a device according to the disclosure for pressing against each other two ophthalmic lenses in order to build an electrochromic cell, in a first particular embodiment.
Figure 1:
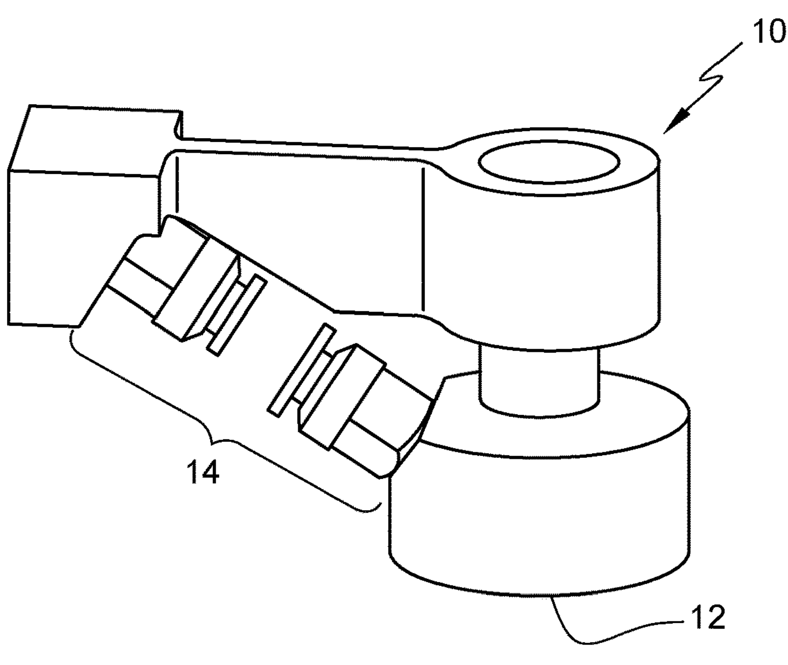

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the disclosure. It will also be obvious to one skilled in the art that all the technical features that are defined relative to a process can be transposed, individually or in combination, to a device and conversely, all the technical features relative to a device can be transposed, individually or in combination, to a process and the technical features of the different embodiments may be exchanged or combined with the features of other embodiments.

The terms “comprise” (and any grammatical variation thereof, such as “comprises” and “comprising”), “have” (and any grammatical variation thereof, such as “has” and “having”), “contain” (and any grammatical variation thereof, such as “contains” and “containing”), and “include” (and any grammatical variation thereof such as “includes” and “including”) are open-ended linking verbs. They are used to specify the presence of stated features, integers, steps or components or groups thereof, but do not preclude the presence or addition of one or more other features, integers, steps or components or groups thereof. As a result, a method, or a step in a method, that “comprises”, “has”, “contains”, or “includes” one or more steps or elements possesses those one or more steps or elements, but is not limited to possessing only those one or more steps or elements.

In the present disclosure, a first ophthalmic lens having a first face and a second ophthalmic lens having a second face are considered. They have to be pressed against each other in order to build an electrochromic cell comprising a cavity delimited by the first and second faces. The first and second lenses are superposed and an adhesive substance is applied on at least one of the first and second faces to form the cavity.

The method according to the present disclosure, for pressing against each other the first and second lenses, comprises applying a pressure effort on the first and second lenses by at least one spring.

In a particular embodiment, the method further comprises managing the pressure effort applied on the lenses by the one or more springs.

For example, the managing process may comprise defining the pressure effort by a predetermined maximum value of the pressure to be applied. By way of non-limiting example, the applied pressure corresponds to a force range between 0.1 daN and 10 daN.

In a particular embodiment, the pressure effort is applied in the periphery of the first and second lenses.

Alternatively, the pressure effort may be applied centrally on the first and second lenses.

In a particular embodiment, the at least one spring is actuated by a programmable electric motor. The programmable electric motor also manages the pressure effort. For example, the managing may comprise defining the pressure effort by a predetermined maximum value of an operating current of the motor beyond which the motor is programmed to stop. To that end, in a particular embodiment, the pressure effort may be measured by using a pressure gauge located between the motor and the first and second lenses. The motor is then programmed to stop when the pressure reaches the predetermined maximum value.

The method according to the disclosure will be more apparent from the following description of various embodiments of devices that are adapted to implement it.

Figure 2:
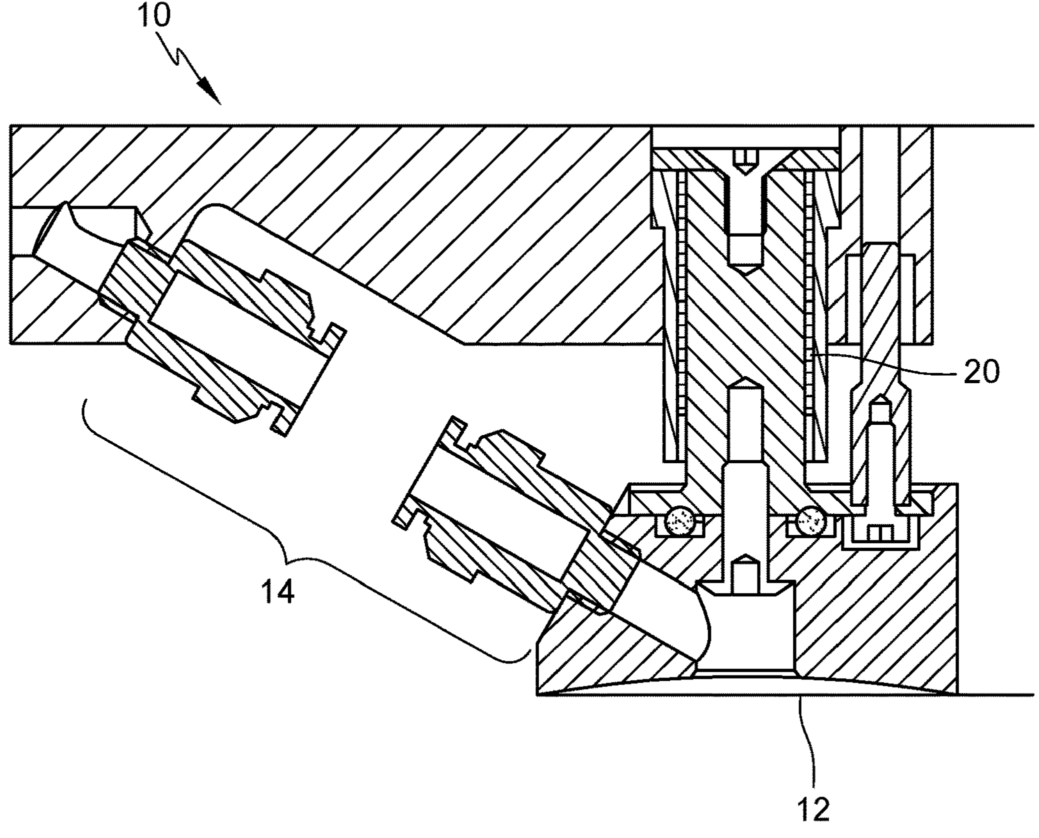
FIG. 2 is a schematic longitudinal sectional view of the device of FIG. 1.

FIGS. 1 and 2 show a particular embodiment of a device 10 according to the present disclosure, for pressing against each other a first ophthalmic lens having a first face and a second ophthalmic lens having a second face, in order to build an electrochromic cell comprising a cavity delimited by the first and second faces. The first and second lenses are superposed and an adhesive substance is applied on at least one of the first and second faces to form the cavity.

According to the present disclosure, the device comprises the two lenses and at least one spring 20, shown in FIG. 2, adapted to apply a pressure effort on the first and second lenses.

One of the first and second lenses is placed in a cup 12 located at the bottom of the device 10. The lens is held in the cup 12 by Venturi effect, through an air suction assembly 14.

In that embodiment, the pressure effort is applied centrally on the first and second lenses.

If the lens in contact with the cup 12 is spherical and has a given radius of curvature, the area of the cup 12 in contact with that lens has ideally the same radius of curvature, but with an opposite sign. If the face of the lens in contact with the cup 12 is convex, the shape of the cup 12 is advantageously more flat i.e. has a higher radius of curvature. Conversely, if the face of the lens in contact with the cup 12 is concave, the shape of the cup 12 is advantageously more curved than the lens i.e. has a smaller radius of curvature.

Figure 3:
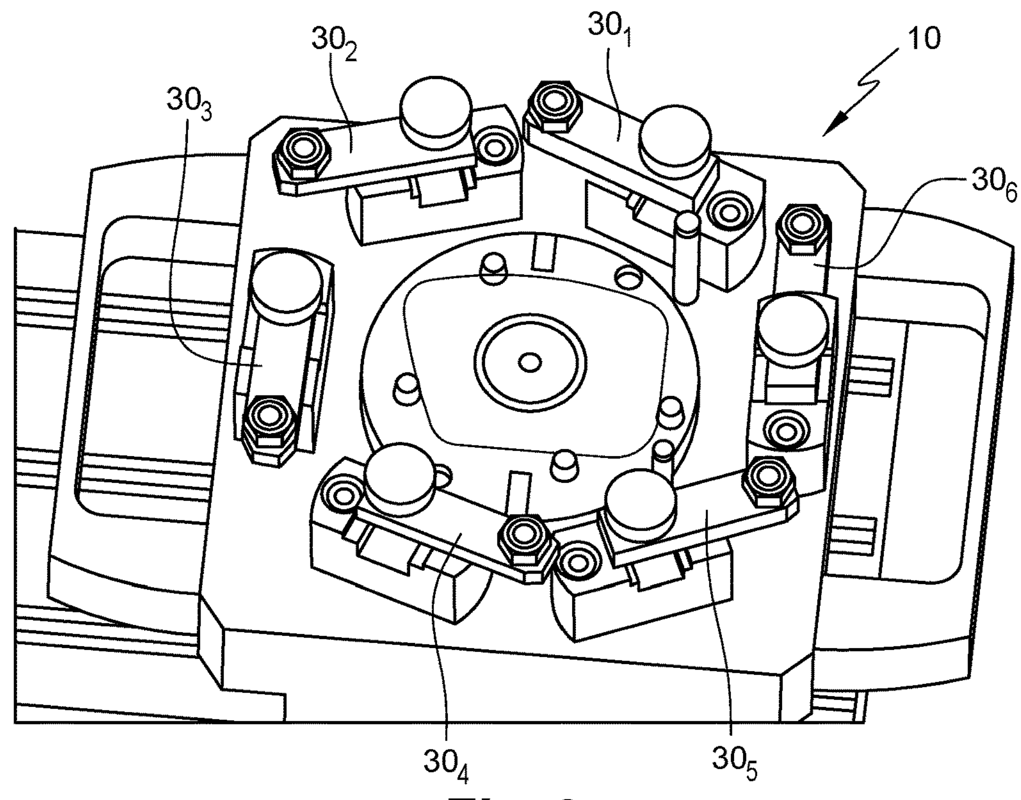
FIG. 3 is a schematic view of a device according to the disclosure for pressing against each other two ophthalmic lenses in order to build an electrochromic cell, in a second particular embodiment.

FIG. 3 shows another particular embodiment of the device 10.

In that embodiment, the pressure effort is applied in the periphery of the lenses. Namely, the device 10 comprises a plurality of pressers $\mathbf{30}_N$, where N=1, . . . , 6, distributed around the lens, whose geometrical center is placed on a holder located at the geometrical center of the device 10. The pressers $\mathbf{30}_N$ may be equally distributed around the lenses.

Each presser $\mathbf{30}_N$ includes at least one spring and can be rotated manually by an angle of 90° so as to contact a region in the peripheral area of the lenses. However, the peripheral area is not contiguous to the edge of the lenses and does not contact the area in which the adhesive substance is applied. A pressure effort is then applied on the lenses by the springs contained in the pressers $\mathbf{30}_N$.

By way of non-limiting example, the number of pressers $\mathbf{30}_N$ can be three, five or six or more.

Figure 4:
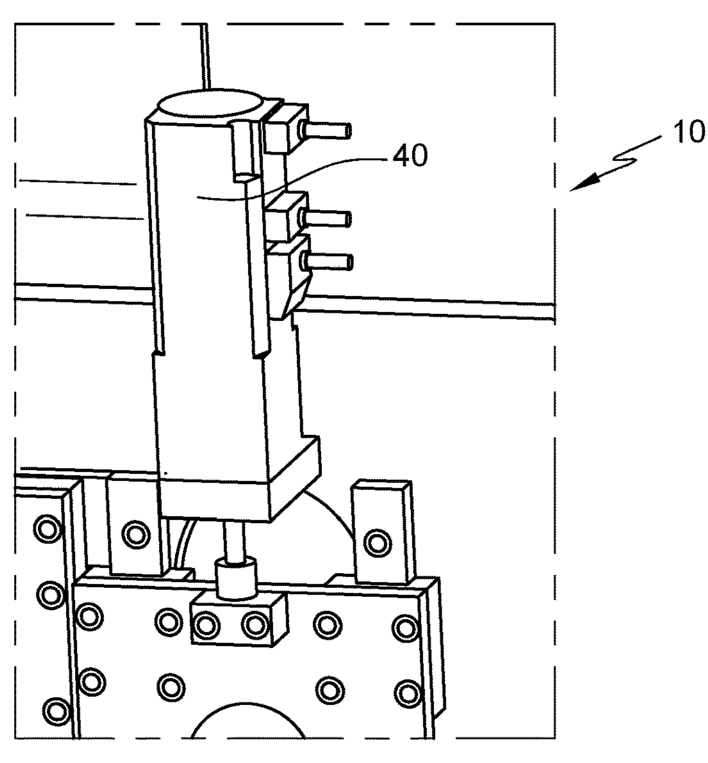
FIG. 4 is a schematic view of a device according to the disclosure for pressing against each other two ophthalmic lenses in order to build an electrochromic cell, in a third particular embodiment.

FIG. 4 shows another particular embodiment of the device 10.

In that embodiment, the pressure effort is applied centrally on the first and second lenses.

In that embodiment, the device 10 may be of the type shown in FIGS. 1 and 2 and further comprises a programmable electric motor 40 adapted to actuate the one or more springs 20 and to thereby control the pressure effort applied on the lenses. Namely, the pressure effort is based on the intensity of the motor 40. For example, the pressure effort corresponds to a predetermined percentage of the maximum current intensity of the motor 40, e.g. 7%.

For more easily monitoring the pressure effort applied on the lenses, the device 10 may further comprise a pressure gauge, located between the motor 40 and the lenses, for example between the motor 40 and the lens holder. As soon as the targeted pressure effort is reached, the motor 40 stops its upward or downward movement.

Moreover, in order to manage more precisely the pressure effort, the device 10 may further comprise a motor encoder adapted to program the motor 40 so as to implement the offset distance between the two lenses. For example, when one of the lenses is picked up by the device 10, an altitude measurement is carried out. Then the motor 40 lifts one of the lenses up and moves it down on the other lens taking account of the offset distance. This makes it possible to use a composition without microspheres for the adhesive substance sealing the cavity formed by the two lenses.

Although representative methods and devices have been described in detail herein, those skilled in the art will recognize that various substitutions and modifications may be made without departing from the scope of what is described and defined by the appended claims.

The invention claimed is:

1. A method for pressing against each other a first ophthalmic lens having a first face and a second ophthalmic lens having a second face in order to build an electrochromic cell having a cavity delimited by said first and second faces, said first and second ophthalmic lenses being superposed and an adhesive substance being applied on at least one of said first and second faces to form said cavity, said method comprising:

applying a pressure effort on said first and second ophthalmic lenses by at least one spring; and actuating said at least one spring and managing said pressure effort by a programmable electric motor, wherein said managing further comprises defining said pressure effort by a predetermined maximum value of an operating current of said motor beyond which said motor is programmed to stop.

2. The method according to claim 1, wherein said managing further comprises defining said pressure effort by a predetermined maximum value of said pressure.

3. The method according to claim 2, further comprising: applying said pressure effort in a periphery of said first and second ophthalmic lenses.

4. The method according to claim 2, further comprising measuring said pressure effort by using a pressure gauge located between said motor and said first and second ophthalmic lenses, said motor being programmed to stop when said pressure reaches said maximum value.

5. The method according to claim 2, further comprising applying said pressure effort centrally on said first and second ophthalmic lenses.

6. The method according to claim 1, further comprising: applying said pressure effort in a periphery of said first and second ophthalmic lenses.

7. The method according to claim 1, further comprising measuring said pressure effort by using a pressure gauge located between said motor and said first and second ophthalmic lenses, said motor being programmed to stop when said pressure reaches a maximum value.

8. The method according to claim 7, further comprising applying said pressure effort centrally on said first and second ophthalmic lenses.

9. The method according to claim 1, further comprising applying said pressure effort centrally on said first and second ophthalmic lenses.

10. A device for pressing against each other a first ophthalmic lens having a first face and a second ophthalmic lens having a second face in order to build an electrochromic cell having a cavity delimited by said first and second faces, said first and second ophthalmic lenses being superposed and an adhesive substance being applied on at least one of said first and second faces to form said cavity, said device comprising:

said first and second ophthalmic lenses and at least one spring adapted to apply a pressure effort on said first and second ophthalmic lenses; and a programmable electric motor adapted to actuate said at least one spring and to control said pressure effort, wherein the programmable electric motor is further adapted to control the pressure effort by being adapted to define said pressure effort by a predetermined maximum value of an operating current of said motor beyond which said motor is programmed to stop.

11. The device according to claim 10, further comprising: three, five or six pressers, each including one of said at least one spring.

12. The device according to claim 11, further comprising: a pressure gauge located between said motor and said first and second ophthalmic lenses.

13. The device according to claim 11, further comprising: a motor encoder adapted to program said programmable electric motor.

14. The device according to claim 10, further comprising: a pressure gauge located between said motor and said first and second ophthalmic lenses.

15. The device according to claim 14, further comprising: a motor encoder adapted to program said programmable electric motor.

16. The device according to claim 10, further comprising: a motor encoder adapted to program said programmable electric motor.

* * * * *